United States Patent [19]

Guiliano et al.

[11] Patent Number: 5,328,721
[45] Date of Patent: * Jul. 12, 1994

[54] PROCESS FOR MANUFACTURING SODIUM CARBONATE PERHYDRATE PARTICLES AND COATING THEM WITH SODIUM BOROSILICATE

[75] Inventors: Basil A. Guiliano; William A. Hills, both of Lawrenceville; Charles V. Juelke, Belle Mead, all of N.J.

[73] Assignee: FMC Corporation, Philadelphia, Pa.

[*] Notice: The portion of the term of this patent subsequent to Mar. 16, 2010 has been disclaimed.

[21] Appl. No.: 922,712

[22] Filed: Jul. 30, 1992

[51] Int. Cl.$^5$ .................. B05D 7/24; C01B 15/10
[52] U.S. Cl. ......................... 427/213; 427/215; 423/415.2; 252/186.27; 252/186.43
[58] Field of Search ............... 427/213, 215; 423/415 P, 272, 415.2; 252/186.27, 186.28, 186.29, 186.38, 186.43, 99

[56] References Cited

U.S. PATENT DOCUMENTS

| | | | |
|---|---|---|---|
| 2,380,620 | 7/1945 | Walters | 23/62 |
| 2,541,733 | 2/1951 | Young | 23/63 |
| 2,955,086 | 10/1960 | Hyatt | 252/99 |
| 3,555,696 | 1/1971 | Pistor et al. | 34/9 |
| 3,677,697 | 7/1972 | Yanush | 23/62 |
| 3,860,694 | 1/1975 | Jayawant | 423/307 |
| 3,864,454 | 2/1975 | Pistor et al. | 423/415 |
| 3,951,838 | 4/1976 | Jayawant et al. | 252/99 |
| 4,020,148 | 4/1977 | Mohr et al. | 423/415 P |
| 4,022,874 | 5/1977 | Mollard et al. | 423/415 P |
| 4,071,462 | 1/1978 | Matsunaga et al. | 252/99 |
| 4,105,827 | 8/1978 | Brichard et al. | 428/403 |
| 4,117,087 | 9/1978 | Dillenburg et al. | 423/275 |
| 4,126,717 | 11/1978 | Mazzola | 427/220 |
| 4,156,039 | 5/1979 | Klebe et al. | 427/215 |
| 4,171,280 | 10/1979 | Maddox et al. | 252/186 |
| 4,185,960 | 1/1980 | Brichard et al. | 423/281 |
| 4,190,635 | 2/1980 | Mesaros et al. | 423/415 P |
| 4,194,025 | 3/1980 | Klebe et al. | 427/215 |
| 4,321,301 | 3/1982 | Brichard et al. | 428/403 |
| 4,421,669 | 12/1983 | Brichard | 252/186.25 |
| 4,428,914 | 1/1984 | Brichard et al. | 423/415 P |
| 4,526,698 | 7/1985 | Kuroda et al. | 252/99 |
| 4,588,569 | 5/1986 | Cyran et al. | 423/244 |
| 4,759,956 | 7/1988 | Amer et al. | 427/213 |
| 4,966,762 | 10/1990 | Pfeffer et al. | 423/415 P |
| 4,970,019 | 11/1990 | Crosby et al. | 252/186.27 |
| 4,970,058 | 11/1990 | Hills et al. | 423/415 P |
| 5,045,296 | 9/1991 | Pfeffer et al. | 423/415 P |
| 5,194,176 | 3/1993 | Copenhafer et al. | 252/186.27 |
| 5,219,549 | 6/1993 | Onda et al. | 252/186.27 |

FOREIGN PATENT DOCUMENTS

| | | |
|---|---|---|
| 0459625 | 12/1991 | European Pat. Off. . |
| 213417 | 9/1984 | Fed. Rep. of Germany ... 423/415 P |
| 59-83912 | 5/1984 | Japan . |
| 60-42206 | 3/1985 | Japan . |
| 4-31498 | 2/1992 | Japan . |
| 1202670 | 8/1970 | United Kingdom . |
| 1260556 | 1/1972 | United Kingdom . |

OTHER PUBLICATIONS

Derwent Abstract of East German Patent 212,947 (Aug. 1984).
Computer Abstract of EP 070711 (Jan. 1983).

Primary Examiner—Terry J. Owens
Attorney, Agent, or Firm—R. E. Elden; P. C. Baker; R. L. Andersen

[57] ABSTRACT

A process to manufacture and coat a sodium carbonate perhydrate containing 10.5% to 14% active oxygen which is stable in a non-phosphate detergent composition and which has a bulk density of from 900 to 1,050 kg/m$^3$. Anhydrous sodium carbonate with a pore volume of at least 0.29 ml/g is contacted with 50% to 75% by weight hydrogen peroxide in the presence of 1-hydroxyethylidene-1,1-diphosphonic acid and water is evaporated at a rate to maintain a dry reaction mixture. The product is coated by sparging sodium borosilicate at a rate to avoid moistening the particles.

15 Claims, No Drawings

PROCESS FOR MANUFACTURING SODIUM CARBONATE PERHYDRATE PARTICLES AND COATING THEM WITH SODIUM BOROSILICATE

This invention is a process to manufacture a stable, sodium carbonate perhydrate composition that is stable in laundry detergent formulations and which readily releases its active oxygen in use.

BACKGROUND OF THE INVENTION

Sodium carbonate perhydrate has been recognized to be a desirable component for a detergent composition because it is readily soluble in water, because it has a high active oxygen content, and because it also provides an inexpensive source of nonpolluting alkalinity. Pure sodium carbonate perhydrate conforms to the chemical formula $2Na_2CO_3.3H_2O_2$ which contains 15.28% active oxygen (AO). However, sodium carbonate perhydrate generally requires a coating to protect it from decomposition when formulated into a detergent and stored in an open container in a laundry room.

Numerous processes have been proposed for manufacturing sodium carbonate perhydrate (SCP). One of the primary methods is a crystallization process in which aqueous solutions of hydrogen peroxide and sodium carbonate are mixed in a reactor and the SCP formed is filtered off. The product is usually salted out by the addition of sodium chloride or other suitable reagents. Such processes are disclosed in U.S. Pat. Nos. 2,380,620 and 2,541,733. While the crystallization process can produce a product with a bulk density of 900 kg/m$^3$ or more and offers advantages such as good mixing and heat transfer, it has the disadvantage that there typically is a substantial loss of active oxygen in the mother liquor, so that low peroxygen efficiencies are obtained. That is, conversion of hydrogen peroxide utilized to active oxygen in the finished product is low.

In another method, taught by U.S. Pat. No. 3,555,696, SCP is made by a spray-drying process in which hydrogen peroxide solution is added immediately before atomization of a spray charge of sodium carbonate in a spray tower. Thereafter the product SCP is dried, yielding a very dusty product with a very low bulk density.

It is apparent from the prior art that large volumes of mother liquor are to be avoided. A process yielding high peroxygen efficiencies usually uses only a sufficiently large amount of water to act as a reaction medium and to provide a heat sink for the heat of reaction.

The desire to minimize the amount of water in the reaction system has led to exploration of the so-called "dry" method. However, when the reaction is carried out in the absence of a sufficient amount of water, the reaction is not efficient and decomposition losses are quite high. In the dry method, hydrogen peroxide is sprinkled directly onto sodium carbonate powder to form a moist mass, the mass is then dried. The procedure may be repeated to build up the oxygen content of the perhydrate. Attempts to operate such a process have produced only unsatisfactory perhydrate products with a low bulk density and thus the process is not in commercial use insofar as is known. Typical dry processes are taught in U.S. Pat. No. 3,864,454, in which it is necessary to dry the product in carbon dioxide and in European Patent Application 0070711, in which the reaction mixture is maintained in a vacuum before drying. In accordance with East German patent 212,947, the product is so fine that a separate recycling granulation step is required. On the other hand, U.S. Pat. No. 4,171,280 avoids the heat sink problem by restricting the amount of hydrogen peroxide to provide a maximum active oxygen content of the product to 6%, thereby avoiding decomposition and caking of wet reaction mixtures.

The dry process for the formation of SCP has a basic deficiency, namely, the difficulty of proper heat transfer of the exotherms that are generated as a result of the reaction. Reaction between aqueous hydrogen peroxide and solid soda ash generates an exotherm in two ways: the heat of hydration of sodium carbonate with the water present in hydrogen peroxide, and the heat of perhydration, that is, the reaction of sodium carbonate with hydrogen peroxide to produce sodium carbonate perhydrate. Both these heats tend to increase the reaction temperature quite markedly, particularly in the absence of efficient mixing and/or cooling.

Dusting is another problem associated with the dry process. When finely divided soda ash is sprinkled with hydrogen peroxide solution and mixed very efficiently to dissipate the heat, a large amount of dust is formed. This results in low peroxygen efficiency and/or a product having low active oxygen values. On the other hand, if granular, dense soda ash is used, the dusting effects are less but the reaction becomes relatively inefficient. In either case, the product tends to agglomerate to form a product with a low bulk density.

A hybrid process combining the dry process and the wet process is taught by U.S. Pat. No. 3,860,694 in which anhydrous or hydrated sodium carbonate having a particle size distribution between U.S. Standard Sieve No. 14 and 325 is contacted with from 35% to 90% hydrogen peroxide, a magnesium stabilizer, and sufficient water to maintain the reaction mass moist. The moist reaction mass is reacted from 5 minutes to 3 hours. Subsequently the moist reaction is dried.

U.S. Pat. No. 4,970,058, teaches a sodium carbonate perhydrate process in which hydrogen peroxide, anhydrous sodium carbonate, and a diphosphonic acid are reacted to make a composition in which sufficient anhydrous sodium carbonate is present to react with any water either already present in the composition, or any water which may be formed from the hydrogen peroxide. The diphosphonic acid appears to permit any water present during the manufacture from being retained as sodium carbonate monohydrate. The process provides high peroxygen efficiency, low dusting and the product is very stable on storage. Its only apparent disadvantage is the maximum active oxygen concentration is about 11.2%. It is desirable to have a product with an active oxygen content higher than 11.2%.

U.S. Pat. No. 5,045,296 teaches a process for SCP by uniformly distributing aqueous 50% to 75% hydrogen peroxide and 1½% to 13% by weight of a diphosphonic acid onto a dry, particulate reaction mixture of anhydrous sodium carbonate with a particle size distribution between 300 and 74 micrometers. The process concurrently balances the heats of hydration and of perhydration of sodium carbonate and the heat of evaporation of water to maintain the reaction mixture between 50° C. and 80° C. to evaporate substantially all of the water from the resulting reaction mixture and cooling the resulting reaction mixture to provide said product as a free-flowing, stable, granular material with a particle size distribution substantially the same as the anhydrous sodium carbonate, and containing between 13% and 14½% active oxygen.

Coating SCP to minimize decomposition when formulated into a detergent not only has the obvious disadvantage of diluting the overall active oxygen content, but also has added disadvantages. These disadvantages include reducing the bulk density because of agglomerating the particles and retarding the rate of release of active oxygen into the solution.

It has been suggested that particles of peroxygen compounds be coated by compounds, such as trona (U.S. Pat. No. 4,105,827); sodium silicate (U.S. Pat. No. 3,951,838); sodium perborate plus sodium silicate (U.S. Pat. No. 4,194,025); boric acid (U.S. Pat. No. 4,321,301); wax (U.S. Pat. No. 4,421,669); a polymer latex (U.S. Pat. No. 4,759,956); sodium silicate plus a chelate (U.S. Pat. No. 4,117,087); and wax plus a fatty acid (U.S. Pat. No. 4,126,717). Many of these treatments show some improvement in short term storage stability in a humid environment. Those few coated SCP products that were stable when formulated into a dry household laundry detergent were found to release their active oxygen when added to water too slowly to be of value in a laundry detergent formulation.

U.S. patent application Ser. No. 5,194,176 filed Apr. 2, 1991 teaches a storage-stable compound of 45% to 75% sodium carbonate perhydrate, 0.1% to 3% diphosphonic acid or salt and anhydrous sodium carbonate coated with sodium borosilicate.

The composition is storage-stable, but has the disadvantage of a low assay.

SUMMARY OF THE INVENTION

The present invention overcomes the disadvantages of the prior art by providing a process for preparing a coated sodium carbonate perhydrate stable in detergent formulations consisting essentially of (a) preparing sodium carbonate perhydrate by the steps of:

(i) uniformly distributing an aqueous hydrogen peroxide solution containing about 50% to about 75% by weight hydrogen peroxide, and an effective amount of 1-hydroxyethylidene-1,1-diphosphonic acid onto a substantially dry particulate reaction mixture, the reaction mixture initially consisting essentially of anhydrous sodium carbonate with a pore volume of at least 0.29 ml/g, (ii) concurrently balancing the heat of hydration and heat of perhydration of the sodium carbonate in the reaction mixture with the heat of evaporation of water and adding sufficient sensible heat to maintain the reaction mixture between 50° C. and 80° C. and to maintain the reaction mixture substantially dry by evaporating water added as the aqueous hydrogen peroxide solution, and (iii) withdrawing at least a portion of the reaction mixture as a particulate sodium carbonate perhydrate containing about 12% to about 14% active oxygen, and about 0.5% to 10% 1-hydroxyethylidene-1,1-diphosphonic acid, and (b) coating sodium carbonate perhydrate particles withdrawn in step (a) (iii) by the steps of:

(i) suspending the particles of sodium carbonate perhydrate in a gas stream thereby substantially eliminating solid-solid contact between the particles, (ii) contacting the suspended particles with a plurality of fine drops of an aqueous sodium borosilicate solution, the sodium borosilicate consisting essentially of a mixture of 25 to 75 parts by weight sodium silicate and from 75 to 25 parts by weight sodium metaborate to provide a $SiO_2:B_2O_3$ weight ratio of from 1:1 to 2:1, and (iii) concomitantly evaporating substantially all the water added with the aqueous borosilicate solution at a sufficient rate to avoid moistening or hydrating the suspended particles, to provide thereby a coated sodium carbonate perhydrate stable in detergent formulations, containing from about 3% to about 10% coating by weight, the coated particles having a bulk density of from 800 to 1050 kg/m$^3$ and containing from 10.5% to about 14% by weight active oxygen, the coated particles releasing substantially all of the active oxygen into water within two minutes.

DETAILED DESCRIPTION OF THE INVENTION

Preferably the temperature should be maintained between 60° C. and 70° C. during and for a short time after addition of the aqueous peroxide/phosphonate solution, and the rate of addition should be controlled to maintain a substantially dry reaction mixture.

The temperature of the reaction mixture can be maintained easily. For example, by a heat exchanger means providing sensible heat transfer between the reaction mixture and the reactor shell or by a gas stream contacting the reaction mixture providing sensible heat transfer for the reaction mixture.

Any suitable solids mixing reactor may be employed such as a fluid bed reactor or a solids mixing device such as a cone mixer, a ribbon mixer, or the like, provided the solids mixing reactor does not function as a size reduction device. Means should be provided in the reactor to conduct water vapor from the surface of the reaction mixture, such as, by directing a gas stream, preferably air, through the reactor. It is not necessary for a gas stream to be directed into the reaction mixture to provide part the agitation of the reaction mixture. The velocity of a gas stream should be sufficiently low to avoid carrying off fines from the reactor.

However, it is contemplated that stabilizers such as magnesium compounds, silicates and chelating agents or mixtures thereof may be added if desired to the soda ash, to the reaction mixture or to the hydrogen peroxide. Other chelating agents may include citrates, phosphates, phosphonic acids and salts, N-carboxylic acids (NTA, EDTA, DTPA) and the like. In addition, it is contemplated that the SCP product may be subsequently coated or formulated into a product.

Any aqueous hydrogen peroxide solution can be used for the process. Desirably, the hydrogen peroxide will be about 65% to 85% by weight, thereby providing a concentration of about 50% to 75% after addition of the diphosphonic acid (usually supplied as a 60% solution). Preferably about 70% hydrogen peroxide will be employed thereby minimizing the sensible heat needed to be added or deducted from the system. The hydrogen peroxide-diphosphonic acid solution must be added at a controlled rate to provide that the reaction mixture remains substantially dry. Water must be permitted to escape from the reaction mixture as vapor, and hydrogen peroxide must be permitted time to form SCP and not accumulate as a liquid.

The presence of an effective amount of hydroxyalkylidene diphosphonic acid in the hydrogen peroxide is critical to obtain a dry product. The diphosphonic acid appears to be effective during the reaction to permit water to be released from the reaction mixture rather than be retained as free or hydrate water. It is particularly effective to add all the diphosphonic acid at the beginning of the reaction (with the first 20-50% of the H₂O₂). The amount of diphosphonic acid required is not related to chelation of polyvalent cations. The diphosphonic acid appears to promote the release of water from the reaction mixture in a similar manner to that described in U.S. Pat. Nos. 4,966,762, 4,970,058 and 5,045,296. However, an entirely different product is formed than by the process of the above patent applications. The product made by the present process generally has a higher active oxygen content.

A particularly desirable diphosphonic acid is commercially available as a 60% solution of 1-hydroxyethylidene-1,1-diphosphonic acid under the tradename DEQUEST 2010 by Monsanto Corporation. The diphosphonic acid solution is usually employed in sufficient quantity to reduce the concentration of 65% to 85% hydrogen peroxide to about 50% to 75%. Preferably sufficient diphosphonic acid should be employed to provide about 0.5% to 10%, preferably 0.5% to 3.5% diphosphonic acid in the product.

The anhydrous sodium carbonate must have a pore volume of at least 0.29 ml/g to produce a stable high assay product without agglomeration. Unexpectedly it is a much better indicator than absorbancy as employed by the detergent industry. In the latter procedure, a liquid non-ionic wetting agent, such as, for example, TRITON X-100, is added to a known weight of sodium carbonate until the mixture becomes tacky and loses its free-flowing properties. The absorbancy is reported as:

$$\% \text{ Non-Ionic Absorbancy} = \frac{\text{Wt. of Wetting Agent}}{\text{Wt. of Product}} \times 100$$

Pore volume is measured by the well-known process disclosed in U.S. Pat. No. 4,588,569, which is incorporated herein by reference. The procedure utilizes a mercury porosimeter, such as described in ASTM Standard C699-72 (Section 106-114). A suitable anhydrous sodium carbonate is available commercially from FMC Corporation under the designation Grade 90.

The amount of sensible heat necessary can be determined easily by one skilled in the art without undue experimentation. Sensible heat can be added to the reaction mixture when more dilute hydrogen peroxide is employed or in the event that insufficient water is being evaporated to maintain the desired temperature or sensible heat can be withdrawn when more highly concentrated hydrogen peroxide is employed. Heat transfer can be accomplished by means well known to the art such as heating or cooling the reactor walls, or by heating or cooling with air or gas contacting the reaction mixture.

The product may then be cooled by any known means, for example, by passing ambient air through the reactor, cooling the reactor walls, preferably to a temperature in the range of 15° C. to 50° C. to provide a free-flowing, stable, granular sodium carbonate perhydrate product.

The granular sodium carbonate perhydrate particles can be coated in a fluid bed by suspending the dry particles in fluidizing gas and applying a solution of sodium borosilicate as a coating by a spray. For the purpose of this invention "suspending . . . to eliminate solid-solid contact" would include permitting particles to be separately lifted by a stream of air or to fall separately as in a tower. Alternately, the invention can be carried out in a tower and applying the coating in a countercurrent, cocurrent or radial spray. Other alternative processes will be apparent to one skilled in the art, such as a spray dryer with both liquid and solids injection, or the like.

It is critical for the present invention that the drops of aqueous solution of sodium borosilicate be much smaller in diameter than the solid SCP particles to avoid agglomerating the particles by wetting the surface, or to avoid forming either a hydrate of SCP, or a sodium carbonate hydrate. It is well known that once formed, sodium carbonate monohydrate is very difficult to dehydrate without concomitantly decomposing any active oxygen compound associated with it.

Unexpectedly a synergism appears to occur when an aqueous solution of 25% to 75% sodium silicate (with a $SiO_2:Na_2O$ ratio of about 3.22) and 75% to 25% sodium metaborate is applied as a solution of sodium borosilicate to the sodium carbonate perhydrate according to the present process, desirably the solution contains 40% to 60% sodium silicate and 60% to 40% sodium metaborate to provide a $SiO_2$ to $B_2O_3$ ratio of about 1:1 to about 2:1. This effect is particularly evident when the coating solution is prepared with about 50% sodium silicate and about 50% sodium metaborate, and the combined solids content is about 25% by weight when applied to the sodium carbonate perhydrate. The invention is described and exemplified in terms of forming a sodium borosilicate solution by combining a sodium silicate solution with a 3.22 weight ratio of $SiO_2$ to $Na_2O$ and sodium metaborate. Other sodium silicates with $SiO_2:Na_2O$ weight ratios ranging from 2.0 to 4.0 and other boron sources, such as borax or boric acid can easily be substituted to provide an equivalent solution. This synergy is observed both by the percent active oxygen retained on coating and the stability of the coated product.

It is essential to avoid substantial agglomeration of particles during coating. Agglomeration is easily measured by a decrease in bulk density. The SCP product should have a bulk density after coating of at least 800 kg/m³ (50 lb/cu.ft.), preferably from 900 kg/m³ to 1,050 kg/m³ when coated with from 3% to 14% sodium borosilicate by weight.

The particles are coated with 3-10% of their weight of sodium borosilicate coating compound. The single coating material may be applied either as a single coat or as multiple coats. The efficacy of the coating is determined by how well the coated particles maintain active oxygen (hydrogen peroxide content).

Solutions of the coating compound can vary in concentration over a large range. Preferably the solutions should contain about 12% to 25% solids. Higher concentrations than 25% can be used but usually must be preheated to prevent crystallization or solids formation and to permit atomization into fine droplets. More dilute solutions require a greater heat input to evaporate the water sufficiently to prevent wetting the particles being coated. With care solutions can range from about 15% solids to about 35% solids.

Typical 25% solids solution preparation is illustrated as follows:

Sodium metaborate: Add 261.8 g sodium metaborate tetrahydrate to 238.2 g water.

Sodium silicate: Add 334.4 g of a 37.4% solution of sodium silicate ($SiO_2:Na_2O$ weight ratio=3.22) to 165.8 g water.

Sodium borosilicate: A blend of above solutions, or their equivalents will contain about 1.4 parts by weight $SiO_2$ per part by weight $B_2O_3$, a solution containing from about 40 to 60 parts by weight sodium silicate and from about 60 to 40 parts by weight sodium metaborate will have a $SiO_2$ to $B_2O_3$ ratio ranging from 1:1 to about 2:1.

The following examples are provided to further illustrate features of the process to one skilled in the art and are not intended to limit the claimed invention in any way.

EXAMPLES

Coating Solution Preparation

The following laboratory procedure outlines the preparation of 25% sodium borosilicate solution (50:50 by weight blend of sodium silicate to sodium borate):

(1) Add 404 g deionized water to 1,000 ml beaker.
(2) Start agitation.
(3) Heat contents to 63° C. (145° F.).
(4) Add 261.8 g of granular, technical grade sodium metaborate 8 mol ($Na_2B_2O_4.8H_2O$) while maintaining temperature at 63° C. (145° F.).
(5) When solution clears add 334.2 g of sodium silicate solution (41° Be; $SiO_2$:$Na_2O$ of 3.2 by weight) while maintaining temperature at 63° C. (145° F.).
(6) Maintain temperature at 63° C. (145° F.) during coating application.

The resulting solution when maintained at 63° C. (145° F.) was clear. Solutions with the other proportions were made in a similar manner.

Stability Tests

Quick: The Quick Test is a method for determining the relative thermal stability (decomposition) of samples in only eight hours. Sufficient sample is added to a closed container connected to a manometer to provide a constant volume to sample weight ratio. The temperature is maintained at 50° C. and the oxygen evolved (the increase in pressure is measured hourly by the slope of the line and is reported as ml/hr). The test can be employed for samples formulated in a detergent base or for unformulated samples of a peroxygen compound ("neat stability").

The Relative Decomposition which is calculated by dividing the Quick Stability by percent AO is useful when comparing samples of widely different assay. The units are ml/hr/% AO.

80/80: The 80/80 Open Box Test simulates the storage of an open box of a detergent formulation. Unless otherwise specified sufficient peroxygen compound to be evaluated is blended in a commercial detergent formulation to provide 0.7% active oxygen by weight. The box containing 0.45 kilograms of formulation is stored with an open lid at 26.7° C. (80° F.) and 80% relative humidity for six weeks. At two week intervals samples are selected by riffling the contents of the box. Active oxygen retained is determined in triplicate.

Coating Process

The apparatus used for coating the dry particles was the STREA-1 Laboratory Fluid-Bed Coater, manufactured by Aeromatic, a division of Niro Industries.

The unit consists of a coating feed container, a tubing pump to dispense the coating solution and the fluid bed coater. The fluid bed coater consists of a clear outer shell for easy viewing, a grid plate to introduce the fluidizing air, and a center draft tube containing an air atomizing spray nozzle. The product introduced into the container is fluidized by a stream of preheated air from below the grid plate. The particles to be coated are recycled through the draft tube until the desired amount of coating is applied.

Coating Procedure

1. Adjust the space between the grid plate and the bottom of the center tube to the specified setting.
2. Adjust the nozzle atomizing air to the desired setting by adjusting the nozzle spray cap.
3. Preheat the fluid bed apparatus to coating temperature.
4. Load the required amount of peroxygen compound into the bed coater.
5. Heat the contents using preheated air which is used to fluidize the contents at mild fluidizing velocity.
6. After the bed temperature of 38°–71° C. (100°–160° F.), preferably 48°–60° C. (120°–140° F.) is attained, increase the air atomizing rate and fluid bed velocity and start the coating application preferably at the predetermined rate.
7. During the coating application, maintain the bed temperature by adjusting the inlet air rate and temperature. Also maintain coating application rate.
8. After the required amount of coating is applied, reverse the coating pump to empty the lines of coating material back to the the feed container, deactivate the air preheater, stop the fluid air to the fluid bed and empty the contents of the container.
9. Weigh the coated material.

EXAMPLE 1

Preparation of SCP Base

The effect of bulk density absorbancy and pore volume of anhydrous sodium carbonate for preparing SCP base were compared by determining the maximum active oxygen content attainable and the Relative Decomposition (reported as ml oxygen per hour per percent of AO). Results are presented as Table I.

Although the bulk density and absorbancy of sample Nos. 1 and 4 were almost the same, sample No. 1 was clearly superior, the maximum active oxygen (AO) attainable being 14.7% vs. 12.7% and the relative decomposition (RD) being one-third.

EXAMPLE 2

A laboratory test was used to evaluate potential SCP coating agents. Samples of SCP were coated and the product was formulated into a 6% phosphate-based laundry detergent containing 0.71% active oxygen. The residual active oxygen was determined after 6 weeks at room temperature. Results are presented as Table II.

In an otherwise identical second series of screening tests the stability was determined only after 4 weeks. Results are presented as Table III.

Unless otherwise specified the SCP contained only 8%–9% active oxygen, the balance being anhydrous sodium carbonate. In some runs 2% sodium silicate or other additives, such as sodium perborosilicate (U.S. Pat. No. 2,955,086). Although the test is not as severe a test as subsequent ones with a zeolite non-phosphate detergent, it was useful to eliminate many coating compounds disclosed as "useful" in the prior art.

EXAMPLE 3

The rate of release of active oxygen (AO) from coated SPC was determined in a series of experiments. Sufficient coated SPC was added to water at 15° C. to provide about 0.2% active oxygen. The solution was stirred at 200 RPM and the concentration of hydrogen peroxide was measured as a function of time. The data are presented in Table IV as time required for 25%, 50%, 75% and 100% release of AO. Uncoated sodium perborate monohydrate and sodium perborate tetrahydrate are included as controls for comparison.

It is evident from Table IV that sodium borosilicate coatings allowed a much more rapid release of active oxygen than sodium silicate alone. Replication of a 4% sodium silicate example showed some coating variability, but in both cases indicated a very poor rate of solubility when a sodium silicate coating is employed.

EXAMPLE 4

Two samples of sodium carbonate perhydrate base prepared according to Example 1 were coated to 6% level with solutions containing the following sodium metaborate to sodium silicate ratios 0:100, 25:75, 50:50, 75:25 and 100:0 (0:1, 1:3, 1:1, 3:1 and 1:0). Quick stabilities and 80/80 long term detergent box stabilities at 26° C. (80° F.) and 80% relative humidity were determined.

Table V shows the synergy when a sodium borosilicate is used to coat base sodium carbonate peroxide with varying sodium metaborate to sodium silicate ratios compared with the sodium silicate and sodium borate alone. Due to the sticky nature of sodium metaborate solutions, it was difficult to coat base SCP with solution at the 100:0 (1:0) sodium metaborate to sodium silicate ratio. The resulting coated product retained water and was highly agglomerated. This problem was also evident with the coating solution ratio of 75:25 (3:1) sodium metaborate to sodium silicate. The resulting coated product quick stability was 0.34 cm/hr as compared to a range between 0.06 to 0.12 cm/hr.

Table V shows the coated product characteristics. Based on 6-week detergent box storage stabilities at 80° F. and 80% RH, products made from coating solutions with a 50:50 (1:1) sodium metaborate to sodium silicate ratio produced the most stable product. The products coated with 1:3 and 3:1 while not as good were still very stable. This indicates the preferred range is about 1:1 (40:60 to 60:40).

EXAMPLE 5

SCP was produced and coated with 50:50 (1:1) borate:silicate as in Examples 1 and 2 using plantscale equipment and stored in plastic lined drums (and one in an unlined supersack) for varying lengths of time under warehouse conditions.

Table VI shows that all of these samples had excellent stability over the periods of time stored.

EXAMPLE 6

The effect of varying the concentration 1-hydroxyethylidene-1,1-diphosphonic acid while making the base SCP and substitution of other chelating agents and additives was evaluated. The other additives were a commercial chelant, mixture of 15–40% pentasodiumdiethylenetriamine acetate and 10–30% trisodium ethylenediaminetetraacetic acid and polyethylene glycol 600. Table VII indicates the maximum AO obtainable and the $H_2O_2$ efficiency of SCP produced.

The results show that other chelating agents and additives have substantially no adverse effect on producing base SCP. It also shows that a minimum about 0.5% (1% of a 60% solution) 1-hydroxyethylidene-1,1-diphosphonic acid is necessary for the production of base SCP. Increasing the percentage from 1.5% to 4.2% (3% to 7% solution) has little increase in effect.

EXAMPLE 7

The two preferable grades of sodium carbonate (Samples 1 and 4) to make SCP base as indicated in Example No. 1 and 4 were evaluated further. The results in Table VIII indicate sample 1, having a typical pore volume of 0.30 was consistently better than sample 4 with a typical pore volume of 0.24 to 0.28.

Other work demonstrated that pore volume decreases with aging of the sodium carbonate. This probably explains some of the variations in the examples.

The example also demonstrates that about 0.5% or more 1-hydroxyethylidene-1,1-diphosphonic acid is required to make base SCP.

EXAMPLE 8

A series of runs were made to study the effect of varying the addition of the diphosphonic acid (1-hydroxyethylidene-1,1-diphosphonic acid) on the base SCP. Approximately 200 parts by weight anhydrous sodium carbonate (bulk density 750 kg/m$^3$) was charged to a ribbon blender. Approximately 84.5 parts $H_2O_2$ 100% containing varying amounts of diphosphonic was sprayed onto the sodium carbonate as a 65%–70% solution. The reaction mixture was swept with sufficient air at 80° C. to maintain the reaction mixture dry and at 70° C.

The specific conditions are presented as Table IX. Several facts are apparent from the Table. The $H_2O_2$ efficiency, the % active oxygen (AO) retained, is a function of the diphosphonic acid employed. The control (no diphosphonic acid) had only a 74% efficiency which increased to 86% with 0.6% and 88%–90% with 1.8% and above. In particular, it shows the advantage of adding all the diphosphonic acid with the first 20% to 50%, preferably the first 25% to 45% of the $H_2O_2$ (runs 4 and 8; 5 and 9). Also obvious is that the bulk density of the reaction mixture generally increases from the initial 750 kg/m$^3$ to 960 and higher (with the single exception of run 9). The example confirms that at least 0.5% diphosphonic acid is desirable with 1% to 3% preferable.

EXAMPLE 9

U.S. Pat. No. 5,045,296 teaches that it is critical for the particle size of the sodium carbonate feed to be less than 70 mesh (213 μm in order to produce a SCP product with a high active oxygen (AO) assay. Example 1 of that patent shows that the assay of 40 and 20 mesh product respectively was 9.4% and 6.8% AO using screened FMC Grade 120 sodium carbonate.

Samples of unscreened FMC Grade 90 and sufficient hydrogen peroxide to produce 13.5% AO SCP product but with varying proportions of diphosphonic were prepared. The products were screened and the fractions assayed. The conditions and results are presented as Table X. It is remarkable that even in the absence of diphosphonic acid there was only a slight decrease in assay with an increase in particle size, and in the presence of even low amounts of diphosphonic acid the differences of AO assays were not significant. Clearly, sodium carbonate with a pore volume of more than 0.29 ml/g unexpectedly has no such critical sizing limitation.

In the tables it is important to note that the bulk density of the sodium carbonate feed generally increases substantially as it is converted to sodium carbonate perhydrate (provided there is no dusting and agglomeration). Generally there is some decrease of bulk density during coating owing to agglomeration.

TABLE I

EFFECT OF SODIUM CARBONATE ON SCP PROPERTIES

| | Sodium Carbonate Feed | | SCP Base (Uncoated) | | |
|---|---|---|---|---|---|
| No. | Absorbancy % | Bulk Dens. kg/m$^3$ | Pore Vol. ml/g | Max. AO % | Rel. Decomp. ml/hr/% AO |
| 1 | 20.6 | 720 | 0.30 | 14.7 | 0.022 |
| 2 | 4.0 | 1,010 | 0.12 | 9.8 | 0.053 |
| 3 | 11.7 | 915 | 0.21 | 11.7 | 0.206* |
| | | | | | 0.048* |
| 4 | 19.7 | 762 | 0.24* | 12.7 | 0.064 |
| | | | 0.28* | | |

*indicates two separate determinations were made

TABLE II

6 WEEK SCREENING TEST FOR COATED SODIUM CARBONATE PERHYDRATE
RT Stability in a 6% PO$_4$ Detergent Formulation

| % | Coating Compound | SCP | SCP + 2% Na$_2$SiO$_3$ | % AO Retained |
|---|---|---|---|---|
| 2 | Na$_2$SiO$_3$ (3.22) | X | | 84 |
| 2 | Na$_2$SiO$_3$ (3.22) | X | | 90 |
| 4 | Na$_2$SiO$_3$ (3.22) | X | | 97 |
| 6 | Na$_2$SiO$_3$ (3.22) | X | | 96 |
| 8 | Na$_2$SiO$_3$ (3.22) | X | | 99 |
| 1 | NaBO$_2$ | | X | 89 |
| 2 | NaBO$_2$ | X | | 90 |
| 4 | NaBO$_2$ | X | | 96 |
| 6 | NaBO$_2$ | X | | 96 |
| 2 | NaBO$_2$ | X | | 84 |
| 4 | NaBO$_2$ | X | | 99 |
| 2 | Sod. Perborate | X | | 93 |
| 2 | K$_2$SiO$_3$ (2.10) | X | | 59 |
| 2 | K$_2$SiO$_3$ (2.50) | X | | 55 |
| 2 | Na$_2$SiO$_3$ (2.40) | X | | 38 |
| 1 | polypropylene glycol (MW 4000) | | X | 83 |
| 2 | polypropylene glycol (MW 4000) | X | | 82 |
| 1 | polyacrylic acid + MgO (pH 9.8) | | X | 90 |
| 1 | polyacrylic acid + NaOH (pH 8) | X | | 83 |
| 2 | polyacrylic acid + NaOH (pH 8) | | | 97 |
| 2 | polyacrylic acid + MgO (pH 9.8) | X | | 82 |
| 2 | polyacrylic acid (pH 6) | X | | 89 |
| 1 | polyacrylic acid (pH 6) | | X | 94 |
| 2 | sodium perborosilicate | | X | 66 |
| 2 | sodium borosilicate | | X | 100 |
| 2 | sodium borosilicate | X | | 89 |
| 2 | sodium perborosilicate | | X | 91 |
| 2 | sodium perborosilicate | X | | 77 |
| 1 | Na$_2$SiO$_3$ (3.22) | | X | 92* |
| 2 | Na$_2$SiO$_3$ (3.22) | | X | 73* |
| 1 | parafin/linoleic acid | | X | 76 |
| 1 | dimethylpolysiloxane | | X | 62 |
| 2 | Na$_2$SiO$_3$ (3.22) | X | | 63 |
| 2 | dimethylpolysiloxane | X | | 87 |

*base also contained 2% sodium perborosilicate as well as 2% Na$_2$SiO$_3$.

TABLE III

4 WEEK SCREENING TEST FOR COATED SODIUM CARBONATE PERHYDRATE
RT STABILITY IN A 6% DETERGENT FORMULATION

| | | SCP Base | | |
|---|---|---|---|---|
| % | Coating Compound | % AO | +2% Na$_2$SiO$_3$ | % AO Retained |
| 1 | C16–18 fatty acid | 8 | X | 56 |
| 2 | Octadecane | 8 | | 96 |
| 2 | K$_2$P$_4$O$_7$ | 8 | | 82 |
| 2 | Na$_2$SiO$_3$ (3.22) | 4 | | 85 |
| 4 | Na$_2$SiO$_3$ (3.22) | 4 | | 72 |
| 2 | Na$_2$SiO$_3$ (3.22) | 8 | | 93 |
| 4 | Na$_2$SiO$_3$ (3.22) | 8 | | 98 |
| 1 | Polyvinylpyrrolidone | 8 | X | 73 |
| 1 | Polyvinylpyrrolidone | 8 | X | 71 |
| 1 | GANTREZ Methylvinyl Ether Resin AN119 | 8 | X | 48 |
| 1 | GANTREZ Methylvinyl Ether Resin AN119 | 8 | X | 97 |
| 1 | Dimethylpolysiloxane | 8 | X | 59 |
| 2 | Polyacrylic + MgO | 8 | | 86 |
| 1 | Polyacrylic + MgO | 8 | X | 90 |
| 1 | DEQUEST 2000 Na salt | 8 | X | 82 |
| 1 | SCP + 2% Na$_2$SiO$_3$ | 8 | X | 79 |
| 1 | DEQUEST 2060 Mg salt | 8 | X | 76* |
| 1 | Polyacrylic Na salt | 8 | | 99* |
| 2 | MgSO$_4$ | 8 | | 99* |
| 1 | MgSO$_4$ | 8 | X | 97* |
| 2 | MgSO$_4$ | 8 | | 97* |
| 1 | MgSO$_4$ | 8 | X | 73* |
| 2 | Na$_2$S$_2$O$_8$ | 8 | | 0.69* |
| 1 | Na$_2$S$_2$O$_8$ | 8 | X | 0.70* |
| 2 | Na$_2$S$_2$O$_8$ | 8 | | 0.70 |
| 1 | Na$_2$S$_2$O$_8$ | | | |

*2 weeks
**GANTREZ AN-119-methyl vinyl ether-maleic anhydride resin

TABLE IV

ACTIVE OXYGEN RELEASE RATE FROM COATED SODIUM CARBONATE PERHYDRATE SCP AT 15° C.

| | | Seconds for Release of AO at 15° C. | | | |
|---|---|---|---|---|---|
| SPC Sample Coating | % Coating | 25% | 50% | 75% | 100% |
| Uncoated SCP* | 0 | 2 | 6 | 11 | 28 |
| Sodium Perborate. 1H$_2$O* | 0 | ~1 | 3 | 4 | 8 |
| Sodium Perborate. 4H$_2$O* | 0 | 39 | 120 | — | — |
| Sodium Silicate | 4 | 15 | 40 | 100 | — |
| Polyacrylate | 2 | 2 | 3 | 11 | 25 |
| Sodium Silicate | 2 | 30 | 73 | 145 | 475 |
| Sodium Silicate | 4 | 60 | 153 | 300 | — |
| Sodium Silicate | 6 | 200 | 440 | — | — |
| Sodium Borosilicate | 2 | 6 | 14 | 24 | 59 |
| Sodium Borosilicate | 4 | 10 | 17 | 27 | 59 |
| Sodium Borosilicate | 6 | 14 | 25 | 39 | 92 |
| Sodium Borosilicate | 8 | 14 | 25 | 39 | 92 |
| Sodium Borosilicate | 10 | 15 | 27 | 42 | 92 |
| Sodium hexametaphosphate | 10 | 8 | 17 | 29 | 62 |
| Sodium metaborate** | 2 | | | | |
| Sodium silicate | 2 | 30 | 57 | 97 | — |

*Controls - no coating
**SCP coated first with 2% sodium metaborate then with 2% sodium silicate

TABLE V

EFFECT OF VARYING RATIOS OF SODIUM METABORATE AND SODIUM SILICATE ON 6% BOROSILICATE COATED SCP

| | | 6% Coated Product | | | |
|---|---|---|---|---|---|
| Base | Ratio | % AO | Bulk Density kg/m$^3$ | Quick ml/hr | 80/80 Box % AO Ret. |
| A | 1:3 | 9.6 | 1,062 | 0.07 | 33 |
| A | 1:1 | 9.5 | 1,025 | 0.06 | 58 |
| A | 3:1 | 8.6 | 988 | 0.34 | 42 |
| B | 1:3 | 8.2 | 1,009 | 0.08 | 24 |
| B | 1:1 | 8.1 | 964 | 0.11 | 40 |
| B | 1:1 | 8.0 | 953 | 0.12 | 45 |

TABLE V-continued

EFFECT OF VARYING RATIOS OF SODIUM METABORATE AND SODIUM SILICATE ON 6% BOROSILICATE COATED SCP

| | | 6% Coated Product | | | |
|---|---|---|---|---|---|
| Base | Ratio | % AO | Bulk Density kg/m³ | Quick ml/hr | 80/80 Box % AO Ret. |
| B | 0:1 | 7.8 | 1,004 | 0.07 | 6 |

Base A: AO - 10.8%; Quick Stab. - 0.05 ml/hr.
Base B: AO - 9.1%; Quick Stab. - 0.13 ml/hr.
Ratio - Wt. Sodium Metaborate: Sodium Silicate

TABLE VI

STABILITY OF COATED SCP IN DRUMS

| Sample | Coating % Borosilicate 1:1 | % AO Initial | % AO Final | Months Stored | % AO Retained |
|---|---|---|---|---|---|
| 1 | 0 | 10.8 | 10.3 | 20 | 95 |
| 2 | 4 | 8.7 | 8.5 | 9 | 98 |
| 3 | 6 | 8.7 | 8.2 | 3 | 94 |
| 4 | 10 | 8.0 | 7.8 | 10 | 98 |
| 5 | 10 | 7.9 | 7.8 | 9 | 99 |
| 6* | 10 | 7.7 | 7.7 | 10 | 100 |

*Stored in an unlined supersack

TABLE VII

EFFECT OF ADDITIVES ON PREPARATION OF SCP BASE

| Run No. | % 1-hydrox | PEG 600 | Chelant | SCP MAX % AO | % $H_2O_2$ Eff. |
|---|---|---|---|---|---|
| 1 | 7 | 0 | 0 | 12.0 | 93 |
| 2 | 3 | 0 | 0 | 13.3 | 93 |
| 3 | 1 | 6 | 0 | 10.8 | 82 |
| 4 | 0 | 0 | 7 | 9.2 | 75 |
| 5 | 0.5 | 0 | 0 | 10.6 | 74 |
| 6 | 0.5 | 0 | 6.5 | 10.1 | 74 |
| 7 | 3 | 0 | 4 | 11.7 | 88 |

Notes:
1-hydroxy - 60% 1-hydroxyethylidene-1,1-diphosphonic acid
PEG-600 - polyethylene glycol 600
chelant - mixture of 15-40% pentasodium diethylenetriamine acetate and 10-30% trisodium ethylenediamine tetraacetic acid

TABLE VIII

COMPARISON OF SODIUM CARBONATE (SODA ASH) FEEDS ON SCP

| | Parts by Weight $H_2O_2$ Added | | | | | |
|---|---|---|---|---|---|---|
| | 80 | | | | 120 | |
| | SA #4 | | SA #1 | | SA #1 | |
| Parts Chelant* | % AO | $H_2O_2$ Eff. | % AO | $H_2O_2$ Eff. | % AO | $H_2O_2$ Eff. |
| 7 | 9.3 | 94 | 9.8 | 94 | 13.2 | 90 |
| 5 | 9.2 | 90 | 9.4 | 93 | 13.2 | 85 |
| 3 | 9.1 | 90 | 9.4 | 91 | 13.0 | 86 |
| 1 | 9.1 | 87 | 9.3 | 94 | 12.8 | 85 |
| 0 | 8.0 | 76 | 8.9 | 85 | 11.4 | 74 |

*Parts by weight of a 60% solution of 1-hydroxyethylidene-1,1-diphosphonic acid
SA #1 = sodium carbonate sample No. 1 from Example 1 (pore vol. = 0.30 mg/g)
SA #2 = sodium carbonate sample No. 4 from Example 1 (pore vol. = 0.24-0.28)

TABLE IX

EFFECTS OF DIPHOSPHONIC ACID ON SCP

| Run | $H_2O_2$ Eff. % | AO % | Bulk Density kg/m³ | Stability ml/hr. |
|---|---|---|---|---|
| 0.0% Diphosphonic Acid in $H_2O_2$ | | | | |
| Control | 73.9 | 11.4 | 956 | 0.18 |
| 0.6% Diphosphonic Acid in $H_2O_2$ | | | | |
| 1 | 86.0 | 13.2 | 971 | 0.16 |
| 2 | 82.7 | 12.7 | 964 | 0.13 |
| 3 | 86.9 | 12.7 | 972 | 0.11 |
| 4* | 86.4 | 12.5 | 1,001 | 0.11 |
| 5** | 86.1 | 12.5 | 1,052 | 0.14 |
| 1.8% Diphosphonic Acid in $H_2O_2$ | | | | |
| 6 | 87.9 | 13.2 | 1,006 | 0.17 |
| 7 | 90.8 | 13.2 | 972 | 0.07 |
| 8* | 92.9 | 13.2 | 987 | 0.16 |
| 9** | 94.0 | 13.5 | 945 | 0.13 |
| 3.0% Diphosphonic Acid in $H_2O_2$ | | | | |
| 10 | 88.0 | 13.2 | 1,011 | 0.47 |
| 4.2% Diphosphonic Acid in $H_2O_2$ | | | | |
| 11 | 93.3 | 13.2 | 1,009 | 0.31 |
| 12 | 89.7 | 12.9 | 993 | 0.29 |

*All the diphosphonic acid added with the first 45% of $H_2O_2$
**All the diphosphonic acid added with the first 25% of $H_2O_2$

TABLE X

SCP ASSAY BY PARTICLE SIZE AND DIPHOSPHONIC ACID (DPA)

| | | ASSAY - % AO | | | | | | |
|---|---|---|---|---|---|---|---|---|
| % DPA | Composite | Size Retained on U.S. Sieve # | | | | | | |
| | | 20 | 40 | 50 | 100 | 140 | 200 | Pan |
| 0.0 | 11.4 | 9.8 | 11.4 | 10.8 | 11.3 | 11.7 | 12.3 | 13.3 |
| 0.6 | 13.2 | 12.8 | 12.6 | 12.9 | 12.9 | 13.0 | 13.0 | 13.0 |
| 1.8 | 13.2 | 12.9 | 12.7 | 12.8 | 12.8 | 12.9 | 14.0 | 14.0 |
| 3.0 | 13.2 | 13.6 | 12.8 | 12.7 | 13.1 | 13.1 | 13.6 | 13.8 |
| 4.2 | 13.2 | 12.8 | 12.5 | 12.8 | 12.9 | 13.0 | 13.4 | 13.4 |

DPA = 1-hydroxyethylidene-1,1-diphosphonic acid in product

We claim:

1. A process for preparing a coated sodium carbonate perhydrate stable in detergent formulations comprising
    (a) preparing sodium carbonate perhydrate by the steps of:
        (i) uniformly distributing an aqueous hydrogen peroxide solution containing about 50% to about 75% by weight hydrogen peroxide, and an effective amount of 1-hydroxyethylidene-1,1-diphosphonic acid to provide a concentration of about 0.5% to 10% by weight in step (a) (iii) onto a substantially dry particulate reaction mixture, the reaction mixture initially consisting essentially of anhydrous sodium carbonate with a pore volume of at least 0.29 ml/g,
        (ii) concurrently balancing the heat of hydration and heat of perhydration of the sodium carbonate in the reaction mixture with the heat of evaporation of water and adding sufficient sensible heat to maintain the reaction mixture between 50° C. and 80° C. and to maintain the reaction mixture substantially dry by evaporating water added as the aqueous hydrogen peroxide solution, and
        (iii) withdrawing at least a portion of the reaction mixture as a particulate sodium carbonate perhydrate containing about 12% to about 14% active oxygen, and about 0.5% to about 10% 1-hydroxyethylidene-1,1-diphosphonic acid, and
    (b) coating sodium carbonate perhydrate particles withdrawn in step (a) (iii) by the steps of:
        (i) suspending the particles of sodium carbonate perhydrate in a gas stream thereby substantially eliminating solid-solid contact between the particles,
        (ii) contacting the suspended particles with a plurality of fine drops of an aqueous solution of sodium borosilicate, the sodium borosilicate consisting essentially of a mixture of from 25 to 75 parts by weight sodium silicate and from 75 to 25 parts by weight sodium metaborate to provide a $SiO_2:B_2O_3$ weight ratio of from 1:1 to 2:1, and (iii) concomitantly evaporating substantially all the water added by the aqueous sodium borosilicate solution at a sufficient rate to avoid moistening or hydrating the suspended particles, to provide thereby a coated sodium carbonate perhydrate containing from about 3% to about 10% coating by weight, the coated particles having a bulk density of from 800 to 1,050 kg/m$^3$ and containing from 10.5% to about 14% by weight active oxygen, the coated particles being capable of releasing substantially all of the active oxygen into water within two minutes.

2. The process of claim 1 wherein the reaction mixture withdrawn in step (a) (iii) contains from 0.5% to 3.5% by weight 1-hydroxyethylidene-1,1-diphosphonic acid.

3. The process of claim 1 wherein the sodium borosilicate solution consists essentially of a mixture of 40 to 60 parts by weight sodium silicate and from 60 to 40 parts by weight sodium metaborate.

4. The process of claim 2 wherein the sodium borosilicate solution consists essentially of a mixture of 40 to 60 parts by weight sodium silicate and from 60 to 40 parts by weight sodium metaborate.

5. The process of claim 1 wherein the solution of sodium borosilicate contains about 25% by weight sodium borosilicate dissolved solids.

6. The process of claim 2 wherein the solution of sodium borosilicate contains about 25% by weight sodium borosilicate dissolved solids.

7. The process of claim 3 wherein the solution of sodium borosilicate contains about 25% by weight sodium borosilicate dissolved solids.

8. The process of claim 4 wherein the solution of sodium borosilicate contains about 25% by weight sodium borosilicate dissolved solids.

9. The process of claim 1 wherein the sodium borosilicate in the sodium borosilicate solution consists essentially of about 50 parts by weight sodium silicate having a $SiO_2:Na_2O$ ratio of about 3:1 and 50 parts by weight sodium metaborate.

10. The process of claim 2 wherein the sodium borosilicate in the sodium borosilicate solution consists essentially of about 50 parts by weight sodium silicate having a $SiO_2:Na_2O$ ratio of about 3:1 and 50 parts by weight sodium metaborate.

11. The process of claim 5 wherein the sodium borosilicate in the sodium borosilicate solution consists essentially of about 50 parts by weight sodium silicate having a $SiO_2:Na_2O$ ratio of about 3:1 and 50 parts by weight sodium metaborate.

12. The process of claim 6 wherein the sodium borosilicate in the sodium borosilicate solution consists essentially of about 50 parts by weight sodium silicate having a $SiO_2:Na_2O$ ratio of about 3:1 and 50 parts by weight sodium metaborate.

13. The process of claim 1 wherein the bulk density of the coated particles is from 900 to 1050 kg/m$^3$.

14. The process of claim 2 wherein the bulk density of the coated particles is from 900 to 1050 kg/m$^3$.

15. The process of claim 9 wherein the bulk density of the coated particles is from 900 to 1050 kg/m$^3$.

* * * * *